United States Patent
Chen et al.

(10) Patent No.: US 10,346,189 B2
(45) Date of Patent: Jul. 9, 2019

(54) CO-LOCATING CONTAINERS BASED ON SOURCE TO IMPROVE COMPUTE DENSITY

(71) Applicant: Red Hat, Inc., Raleigh, NC (US)

(72) Inventors: Huamin Chen, Westborough, MA (US); Jay Vyas, Concord, MA (US)

(73) Assignee: Red Hat, Inc., Raleigh, NC (US)

( * ) Notice: Subject to any disclaimer, the term of this patent is extended or adjusted under 35 U.S.C. 154(b) by 102 days.

(21) Appl. No.: 15/368,852

(22) Filed: Dec. 5, 2016

(65) Prior Publication Data

US 2018/0157508 A1    Jun. 7, 2018

(51) Int. Cl.
*G06F 9/455* (2018.01)
*G06F 9/50* (2006.01)

(52) U.S. Cl.
CPC ........... *G06F 9/45545* (2013.01); *G06F 9/50* (2013.01); *G06F 2009/4557* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 7,814,491 | B1 * | 10/2010 | Chen | G06F 9/5016 709/226 |
| 8,468,345 | B2 * | 6/2013 | Auradkar | G06F 21/602 707/827 |
| 8,677,359 | B1 * | 3/2014 | Cavage | G06F 9/5011 718/1 |
| 9,047,157 | B1 * | 6/2015 | Boussarov | G06F 8/61 |
| 9,122,562 | B1 * | 9/2015 | Stickle | G06F 8/71 |
| 9,152,445 | B2 | 10/2015 | Ahmad et al. | |
| 9,256,467 | B1 * | 2/2016 | Singh | G06F 9/5055 |
| 9,378,227 | B2 * | 6/2016 | Brooks | G06F 17/30575 |
| 9,448,790 | B2 * | 9/2016 | Collison | G06F 8/71 |
| 9,462,427 | B2 | 10/2016 | Patel et al. | |
| 9,921,885 | B2 * | 3/2018 | Antony | G06F 9/5077 |
| 9,936,047 | B2 * | 4/2018 | Adolph | H04L 12/4641 |

(Continued)

OTHER PUBLICATIONS

Miller, Rich, Combining Colocation and Containers, Data Center Knowledge, May 27, 2009 (2 pages) Link: datacenterknowledge.com/archives/2009/05/27/combining-colocation-and-containers/.

(Continued)

*Primary Examiner* — Abu Ghaffari
(74) *Attorney, Agent, or Firm* — K&L Gates LLP

(57) ABSTRACT

Co-locating containers based on source to improve compute density is disclosed. For example, a repository stores image files associated with metadata. A scheduler receives a request to launch a container using an image file having a source. The container is launched in a host with a first version of first and second container components loaded to a host memory. A request to launch another container using another image file having the source is received. This container includes the first version of first and third container components, and is launched in the host. The first version of the third container component is loaded to the host memory. A request to launch a third container using a third image file having a different source is received, and is launched in the second host, including a second version of the first, second and third container components, all loaded to a second host memory.

16 Claims, 6 Drawing Sheets

(56) References Cited

U.S. PATENT DOCUMENTS

| | | | |
|---|---|---|---|
| 9,940,470 B2* | 4/2018 | Nachenberg | G06F 21/62 |
| 10,013,265 B2* | 7/2018 | Kairali | G06K 9/6218 |
| 2010/0205156 A1* | 8/2010 | Anderson | G06F 17/30067 |
| | | | 707/690 |
| 2012/0005663 A1* | 1/2012 | Burckart | G06F 9/44521 |
| | | | 717/166 |
| 2012/0198442 A1* | 8/2012 | Kashyap | G06F 8/61 |
| | | | 718/1 |
| 2012/0204173 A1* | 8/2012 | Liu | G06F 9/44505 |
| | | | 718/1 |
| 2014/0053150 A1* | 2/2014 | Barnett | G06F 9/455 |
| | | | 718/1 |
| 2014/0248002 A1* | 9/2014 | Thakkar | G06F 17/3028 |
| | | | 382/305 |
| 2015/0089577 A1* | 3/2015 | Beckman | H04L 63/105 |
| | | | 726/1 |
| 2015/0120928 A1* | 4/2015 | Gummaraju | H04L 67/1008 |
| | | | 709/226 |
| 2015/0142878 A1* | 5/2015 | Hebert | H04L 67/10 |
| | | | 709/203 |
| 2015/0263983 A1 | 9/2015 | Brennan et al. | |
| 2015/0310043 A1* | 10/2015 | Adelman | G06Q 30/0264 |
| | | | 705/14.41 |
| 2016/0092250 A1* | 3/2016 | Wagner | G06F 9/45558 |
| | | | 718/1 |
| 2016/0098570 A1* | 4/2016 | Huang | G06F 21/629 |
| | | | 726/17 |
| 2016/0164723 A1* | 6/2016 | Cimprich | H04L 41/0806 |
| | | | 709/221 |
| 2016/0188316 A1* | 6/2016 | Liang | G06F 8/658 |
| | | | 717/169 |
| 2016/0205518 A1* | 7/2016 | Patel | H04L 67/1002 |
| | | | 455/518 |
| 2017/0034023 A1* | 2/2017 | Nickolov | H04L 43/0817 |
| 2017/0116278 A1* | 4/2017 | Baby | G06F 17/30486 |
| 2017/0177860 A1* | 6/2017 | Suarez | G06F 21/53 |
| 2017/0206071 A1* | 7/2017 | Kirkpatrick | G06F 8/61 |
| 2017/0269978 A1* | 9/2017 | Engel | G06F 9/541 |
| 2017/0322934 A1* | 11/2017 | Chen | G06F 8/71 |
| 2018/0046487 A1* | 2/2018 | Matters | G06F 17/30174 |
| 2018/0137032 A1* | 5/2018 | Tannous | G06F 11/3664 |

OTHER PUBLICATIONS

Coleman et al., OpenShift 3.x System Design, RedHat, Dec. 19, 2014 (14 pages) Link: github.com/openshift/openshift-pep/blob/master/openshift-pep-013-openshift-3.md.

Metral, Mike, Introduction to Container Technologies: Scheduling and Management of Services and Resources, Rackspace, Oct. 16, 2015 (6 pages) Link: getcarina.com/docs/best-practices/container-technologies-scheduling-management/.

Grillet, Armand, Comparison of Container Schedulers, Mesosphere, Feb. 24, 2016 (44 pages). Link: medium.com/@ArmandGrillet/comparison-of-container-schedulers-c427f4f7421#.1pts5nx1y.

Mothiki, Sivaram, Schedulers, Part 2: Kubernetes, Apr. 14, 2016 (11 pages). Link: deis.com/blog/2016/schedulers-pt2-kubernetes/.

* cited by examiner

CO-LOCATING CONTAINERS BASED ON SOURCE TO IMPROVE COMPUTE DENSITY

BACKGROUND

The present disclosure generally relates to deploying isolated guests in a network environment. In computer systems, it may be advantageous to scale application deployments by using isolated guests such as virtual machines and containers that may be used for creating hosting environments for running application programs. Typically, isolated guests such as containers and virtual machines may be launched to provide extra compute capacity of a type that the isolated guest is designed to provide. Isolated guests allow a programmer to quickly scale the deployment of applications to the volume of traffic requesting the applications. Isolated guests may be deployed in a variety of hardware environments. There may be economies of scale in deploying hardware in a large scale. To attempt to maximize the usage of computer hardware through parallel processing using virtualization, it may be advantageous to create very lean isolated guests, designed to include only components necessary to achieve the function for which these isolated guests are designed. In many cases, containers may be leaner than virtual machines because a container may be operable without a full copy of an independent operating system, and may thus result in higher compute density and more efficient use of physical hardware. Many isolated guests are built from image files, and the image files tend to be designed to be lean to decrease the latency required to launch an isolated guest.

SUMMARY

The present disclosure provides a new and innovative system, methods and apparatus for co-locating containers based on source to improve compute density. In an example, a repository stores a first plurality of image files associated with a respective first plurality of metadata, the first plurality of image files including a first image file associated with first metadata and a second image file associated with second metadata. The repository may also store a third image file associated with third metadata. A first host is associated with a first host memory and a second host is associated with a second host memory. A scheduler executes on one or more processors and receives a request to launch a first container using the first image file, where the first metadata includes a first source. The first container is launched in the first host. The first container includes a first version of a first container component and a first version of a second container component. Then, both container components are loaded to the first host memory. A request to launch a second container using the second image file is received, and it is determined that the second metadata includes the first source. The second container is launched in the first host. The second container includes the first version of the first container component and a first version of a third container component. Then, the first version of the third container component is loaded to the first host memory. A request to launch a third container using the third image file is received, and it is determined that the third metadata includes a second source that is different from the first source. The third container is launched in the second host. The third container includes a second version of the first container component, a second version of the second container component, and a second version of the third container component. Then, all three container components are loaded to the second host memory.

Additional features and advantages of the disclosed method and apparatus are described in, and will be apparent from, the following Detailed Description and the Figures.

DETAILED DESCRIPTION OF EXAMPLE EMBODIMENTS

Figure 1:
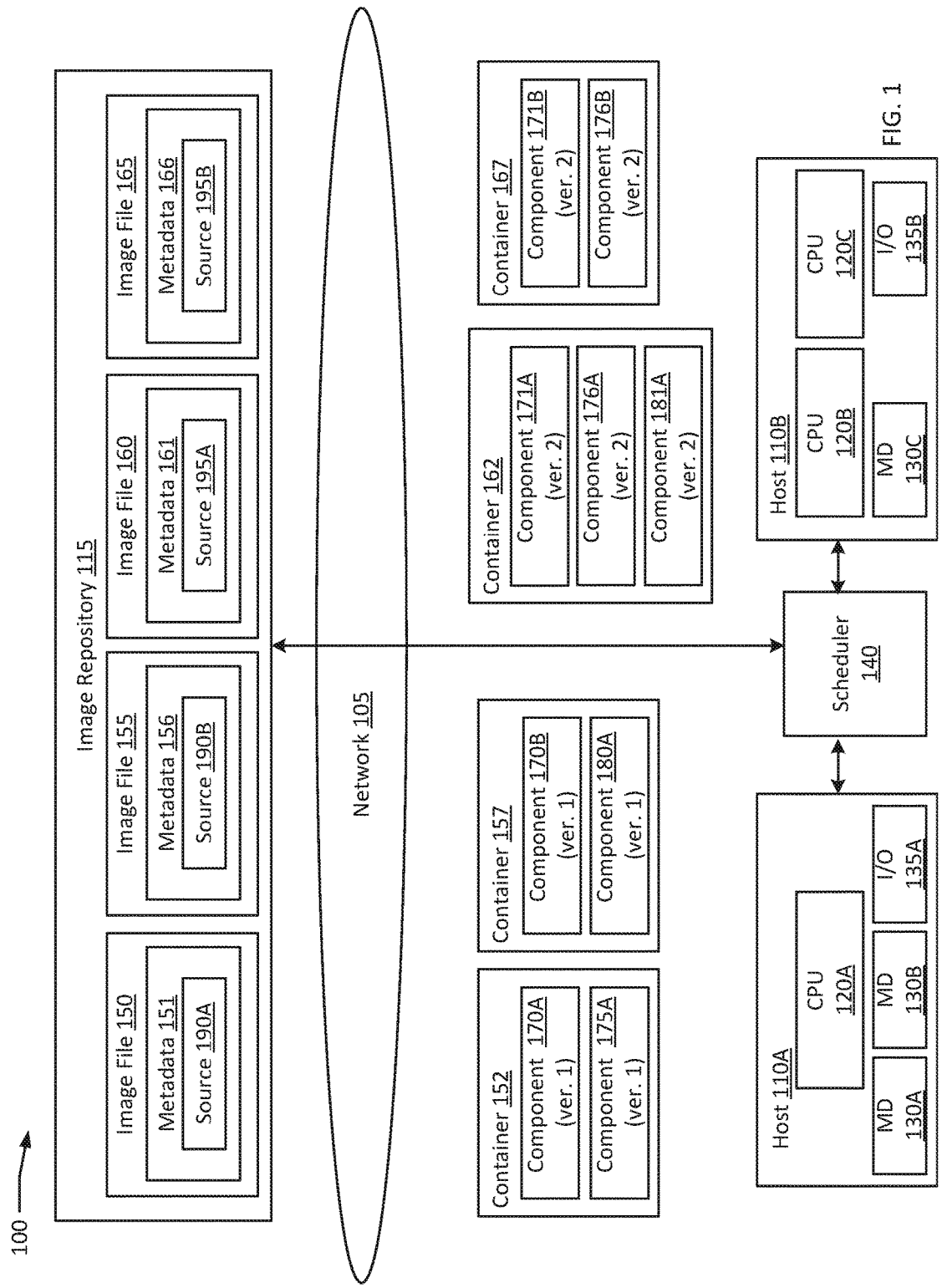
FIG. 1 is a block diagram of a system co-locating containers based on source to improve compute density according to an example of the present disclosure.

In computer systems utilizing isolated guests, typically virtual machines and/or containers are used. In an example, a virtual machine ("VM") may be a robust simulation of an actual physical computer system utilizing a hypervisor to allocate physical resources to the virtual machine. In some examples, container based virtualization system such as Red Hat® OpenShift® or Docker® may be advantageous as container based virtualization systems may be lighter weight than systems using virtual machines with hypervisors. Isolated guests tend to be constructed from image files, the image files typically composed of individual layers of components. An isolated guest may be constructed with the intent to minimize the number of layers and the size of the isolated guest to speed up loading time and deployment of the isolated guest. As a result, many isolated guests, especially those performing similar functions, may be designed to include a limited number of components such as libraries, and those components tend to be associated with the functionality of the isolated guest. In the case of containers, oftentimes a container will be hosted on a physical host or virtual machine that already has a host operating system running, and the container may be hosted on the host operating system.

Containers may allow wide spread, parallel deployment of computing power for specific tasks. However, to perform its designed functions, a container may load certain components such as libraries into Random Access Memory (RAM). In a typical example, a hosting service, such as a multi-tenant cloud provider, may distribute containers to any host system with sufficient free system resources to host the container. In such an example, there may be many containers from different users or tenants of the cloud operating within the same physical host, such users or tenants being potential sources of these containers. Each of these containers may then request to load numerous components such as libraries into the RAM of the physical host. In an example, only one copy of a particular component such as a library is required to be loaded in a host's RAM for the host operating system and/or any isolated guests on the system to use that particular component. In an example, distributing containers on a system based on system resource availability may be disadvantageous for container density, because programmers creating the image files used in launching such containers may over budget the RAM requirements for a container assuming that all of the containers' required libraries will be taking up the budgeted RAM for the container. In cases where a container is executing on a host with few other isolated guests with shared components, the components needed by such a container may be repeatedly shifted in and out of the RAM of the physical host incurring latency. In an example, a physical host may reclaim RAM from components not used in a given time frame, and in such an example, the more a given component is used, the less likely it is for such a time frame to elapse and thus, the less likely additional latency will be incurred to reload the given component when needed at a later time.

The present disclosure aims to address the above inefficiencies, for example in memory usage and added latency in containers, by co-locating containers based on source to improve compute density. In a basic example, two identical containers (e.g., two containers launched from the same image file) would likely perform similar functions and require similar components to be loaded in a host's physical RAM. It is more likely, then, that when one of those two containers needs a particular library, that the particular library would already be loaded into the host's physical RAM. In such an example, a library that was loaded to the physical RAM for the first container may be mapped to the second container in response to a system call such as mmap without loading a second copy of the library to the physical RAM on the host system. Example embodiments of the present disclosure leverage this library sharing behavior by co-locating containers on physical hosts based on metadata to increase the proportion of shared components such as libraries within containers executing on the same physical host.

FIG. 1 is a block diagram of a system co-locating containers based on source to improve compute density according to an example of the present disclosure. The system 100 may include one or more interconnected hosts 110A-B. Each host 110A-B may in turn include one or more physical processors (e.g., CPU 120A-C) communicatively coupled to memory devices (e.g., MD 130A-C) and input/output devices (e.g., I/O 135A-B). As used herein, physical processor or processors 120A-C refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-C refers to a volatile or non-volatile memory device, such as RAM, ROM, EEPROM, or any other device capable of storing data. As discussed herein, I/O device 135A-B refers to a device capable of providing an interface between one or more processor pins and an external device, the operation of which is based on the processor inputting and/or outputting binary data. Processors (Central Processing Units "CPUs") 120A-C may be interconnected using a variety of techniques, ranging from a point-to-point processor interconnect, to a system area network, such as an Ethernet-based network. Local connections within each host 110A-B, including the connections between a processor 120A and a memory device 130A-B and between a processor 120A and an I/O device 135A may be provided by one or more local buses of suitable architecture, for example, peripheral component interconnect (PCI).

In an example, system 100 may run one or more isolated guests, for example, containers 152, 157, 162, and 167 may all be isolated guests. In an example, containers 152, 157, 162, and 167 may be a container using any form of operating system level virtualization, for example, Red Hat® OpenShift®, Docker® containers, chroot, Linux®-VServer, Solaris® Containers (Zones), FreeBSD® Jails, HP-UX® Containers (SRP), VMware ThinApp®, etc. Containers may run directly on a host operating system or run within another layer of virtualization, for example, in a virtual machine. In an example, containers 152 and 157 may be executing on host 110A and containers 162 and 167 may be executing on host 110B. The containers 152, 157, 162, and 167 may be executing directly on hosts 110A-B or with an intermediary layer such as a virtual machine executing on a hypervisor on hosts 110A-B.

In an example, scheduler 140 may be a container orchestrator such as Kubernetes® or Docker Swarm®. In the example, scheduler 140 may be in communication with both hosts 110A-B and an image repository 115. In an example, image repository 115 may be an image repository found in containerization products such as Docker® DockerHub®, Pivotal® Cloud Foundry, IBM® BlueMix®, Amazon® Amazon Web Services® (AWS®), Google® Google Cloud Platform™, or Microsoft® Azure®. The image repository 115 may store a plurality of image files (e.g., 150, 155, 160, and 165) used to construct isolated guests, for example, containers 152, 157, 162 and 167. In an example, each image file (150, 155, 160, and 165) may be associated with a respective metadata (151, 156, 161, and 166), each metadata including references to at least one source (190A, 190B, 195A, 195B). In some examples, sources 190A and 190B may be the same source, and sources 195A and 195B may be the same source as each other but a different source from sources 190A-B. In some examples, the image repository 115 may reside over a network 105, which may be, for example, a public network (e.g., the Internet), a private network (e.g., a local area network (LAN) or wide area network (WAN)), or a combination thereof.

In an example, metadata 151, 156, 161, and 166 may be associated with image files 150, 155, 160, and 165 via any suitable approach. In another example, metadata 151, 156, 161, and 166 may be consolidated in one or more files associated with the image repository 115 instead of with individual image files. For example, metadata 151, 156, 161, and 166 may be stored as part of image files 150, 155, 160, and 165 (e.g., metadata 151 forms a header in a file storing image file 150). As another example, metadata 151, 156, 161, and 166 may be stored in a separate location from the content of image files 150, 155, 160, and 165. In particular, metadata 151, 156, 161, and 166 may be stored in metadata files (e.g., one file associated with each respective image file), a database (e.g., metadata database within an electronic device or within a particular application), remote location (e.g., a remote server), or any other suitable location. If metadata 151, 156, 161, and 166 are stored separately from the image files 150, 155, 160, and 165, metadata 151, 156, 161, and 166 may be associated with the image files 150, 155, 160, and 165 using any suitable approach, including for example one or more references in metadata 151, 156, 161, and 166 and/or content, pointers, links, or other combinations of these. Metadata 151, 156, 161, and 166 may include any suitable type of metadata. In an example, metadata 151, 156, 161 and 166 may all be parts of the same metadata file associated with the image repository 115.

In an example, included within metadata 151, 156, 161, and 166 may be a field indicative of a source (e.g., 190A-B, 195A-B). In some examples, there may be a field in metadata 151, 156, 161, and 166 indicating a provider of the operating system that the image file is based on. For example, sources 190A-B may both be based on the same operating system. (e.g., Red Hat® Linux®). Sources 195A-B may also be based on the same operating system as each other, in a example, sources 195A-B may be based on one of SUSE® Linux®, Ubuntu® Linux®, Solaris® from ORACLE® CORPORATION, Windows® from MICROSOFT® CORPORATION, etc. In an example, a source may include a specific release version for a particular operating system or component. In other examples, the metadata 151, 156, 161, and 166 may include multiple fields that may be interpreted as sources. For example, metadata 151 may include a reference to a source for a component part of image file 150. In an example, image file 150 may include a Java® runtime environment, and metadata 151 may include a reference to the version of Java® incorporated into image file 150, and such reference may also be a source.

In an example, container 152 is launched from image file 150 on host 110A, and container 152 includes two components, component 170A (a first version of a first container component) and 175A (a first version of a second container component). In an example, component 170A and component 175A may be libraries allowing container 152 to support executing code in C and C++. For example, the components 170A and 175A may be libc and libc++, respectively. In an example, container 157 is launched from image file 155 on host 110A, and container 157 includes two components, component 170B (a first version of a first container component) and component 180A (a first version of a third container component). In an example, components 170B and 180A may be libraries allowing container 152 to support executing code in C and Java®. For example the components 170B and 180A may be libc and rt.jar respectively. In an example, components 170A and 170B may be two copies of the same libc library. In an example where sources 190A-B are indicative of an operating system provider, for example, Red Hat® providing Red Hat® Linux®, containers 152 and 157 may both operate on the same version of Red Hat® Linux® and may both include the same copy of libc that ships with the version of Red Hat® Linux® that is executed on containers 152 and 157. In an example, component 175A may be a version of libc++ that ships with Red Hat® Linux® and component 180A may be a version of rt.jar integrated with the same version of Red Hat® Linux®.

In an example, container 162 is launched from image file 160 on host 110B, and container 162 includes three components, 171A (a second version of a first container component), component 176A (a second version of a second container component), and 181A (a second version of a third container component). In an example, components 171A, 176A, and 181A may be libraries allowing container 162 to support executing code in C, C++ and JAVA®. For example the components 171B, 176A and 181A may be libc, libc++, and rt.jar respectively. In an example, container 167 is launched from image file 165 on host 110B, and container 167 includes two components, component 171B (a first version of a first component), and component 176B (a first version of a second component). In an example, components 171B and 176B may be libraries allowing container 162 to support executing code in C and C++. For example, the components 171B and 176B may be libc and libc++, respectively. In an example, components 171A and 171B may be two copies of the same libc library, and components 176A and 176B may be two copies of the same libc++ library. In an example where sources 195A-B are indicative of an operating system provider, for example, SUSE® providing SUSE® Linux®, containers 162 and 167 may both operate on the same version of SUSE® Linux® and may both include the same copy of libc that ships with the version of SUSE® Linux® that is executed on containers 162 and 167. In an example, component 176A may be a version of libc++ that ships with SUSE® Linux® and component 181A may be a version of rt.jar integrated with the same version of SUSE® Linux®.

In an example, components 170A, 170B, 171A, 171B, 175A, 176A, 176B, 180A, and 181A may be any part of containers 152, 157, 162, and 167 that are loaded into RAM on a host system in order for the containers 152, 157, 162, and 167 to perform a designed function. For example, components 170A, 170B, 171A, 171B, 175A, 176A, 176B, 180A, and 181A may be runtimes, dynamic link libraries, static libraries, frameworks, component libraries, objects, methods, functions, or procedures.

Figure 2:
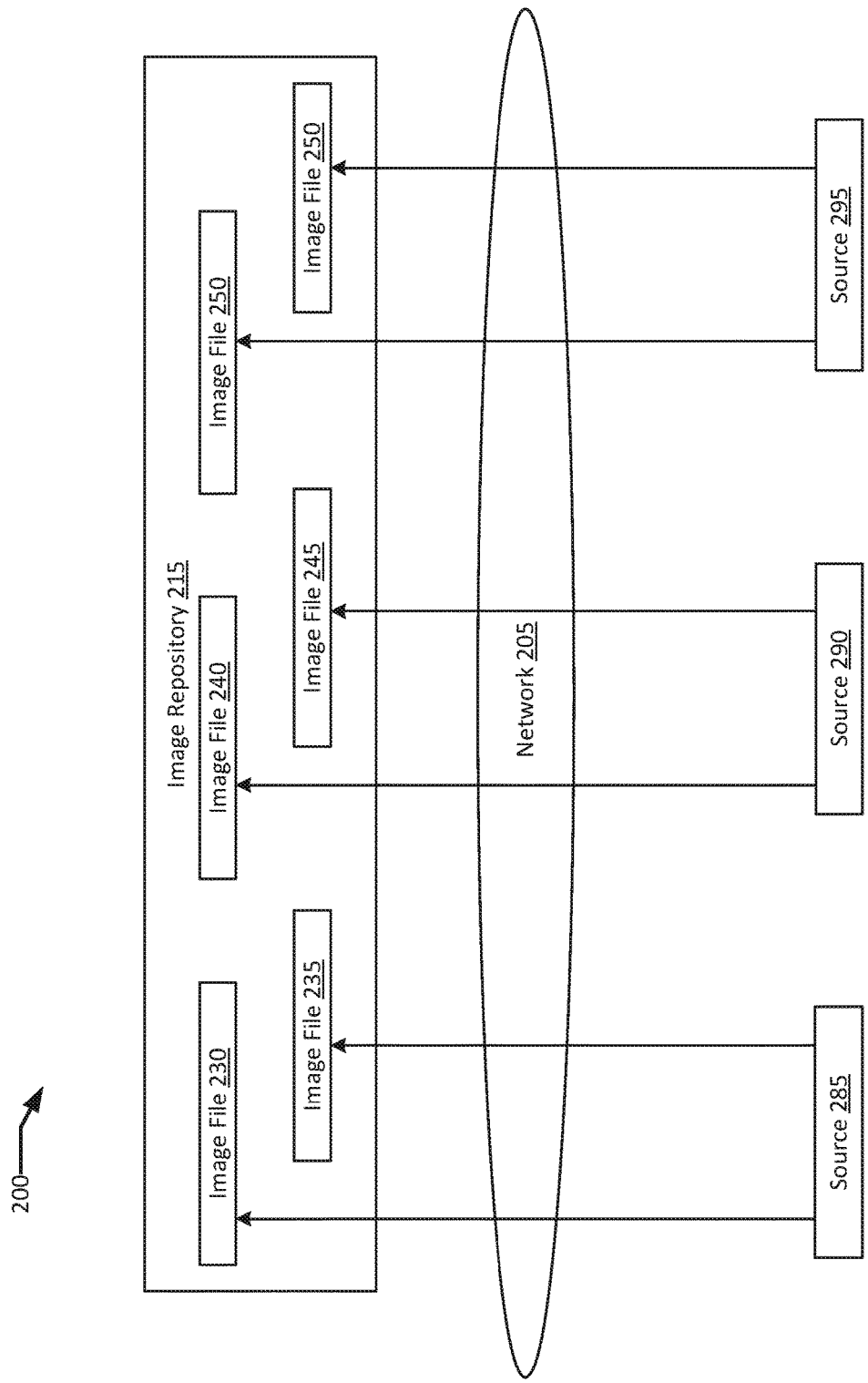
FIG. 2 is a block diagram of the relationship between sources and image files according to an example of the present disclosure.

FIG. 2 is a block diagram depicting the relationship between sources and image files according to an example of the present disclosure. In an example, image repository 215 may be an image repository found in containerization products such as Docker® DockerHub®, Pivotal® Cloud Foundry, IBM® BlueMix®, Amazon® Amazon Web Services® (AWS®), Google® Google Cloud Platform™, or Microsoft® Azure®. The image repository 215 may store a plurality of image files 230, 235, 240, 245, 250 and 255 used to construct isolated guests. In an example, sources 285, 290 and 295 may be three different providers of operating systems, for example, Red Hat®, SUSE® and Ubuntu®. In some examples, the image repository 215 may reside over a network 205 from the sources 285, 290 and 295. The network 205 may be, for example, a public network (e.g., the Internet), a private network (e.g., a local area network (LAN) or wide area network (WAN)), or a combination thereof. In an example, image files 230 and 235 may based on the same operating system (e.g., Red Hat® Linux®) and therefore share a source 285. In an example, image files 240 and 245 may based on the same operating system (e.g., SUSE® Linux®) and therefore share a source 290. In an example, image files 250 and 255 may based on the same operating system (e.g., Ubuntu® Linux®) and therefore share a source 295.

Figure 3:
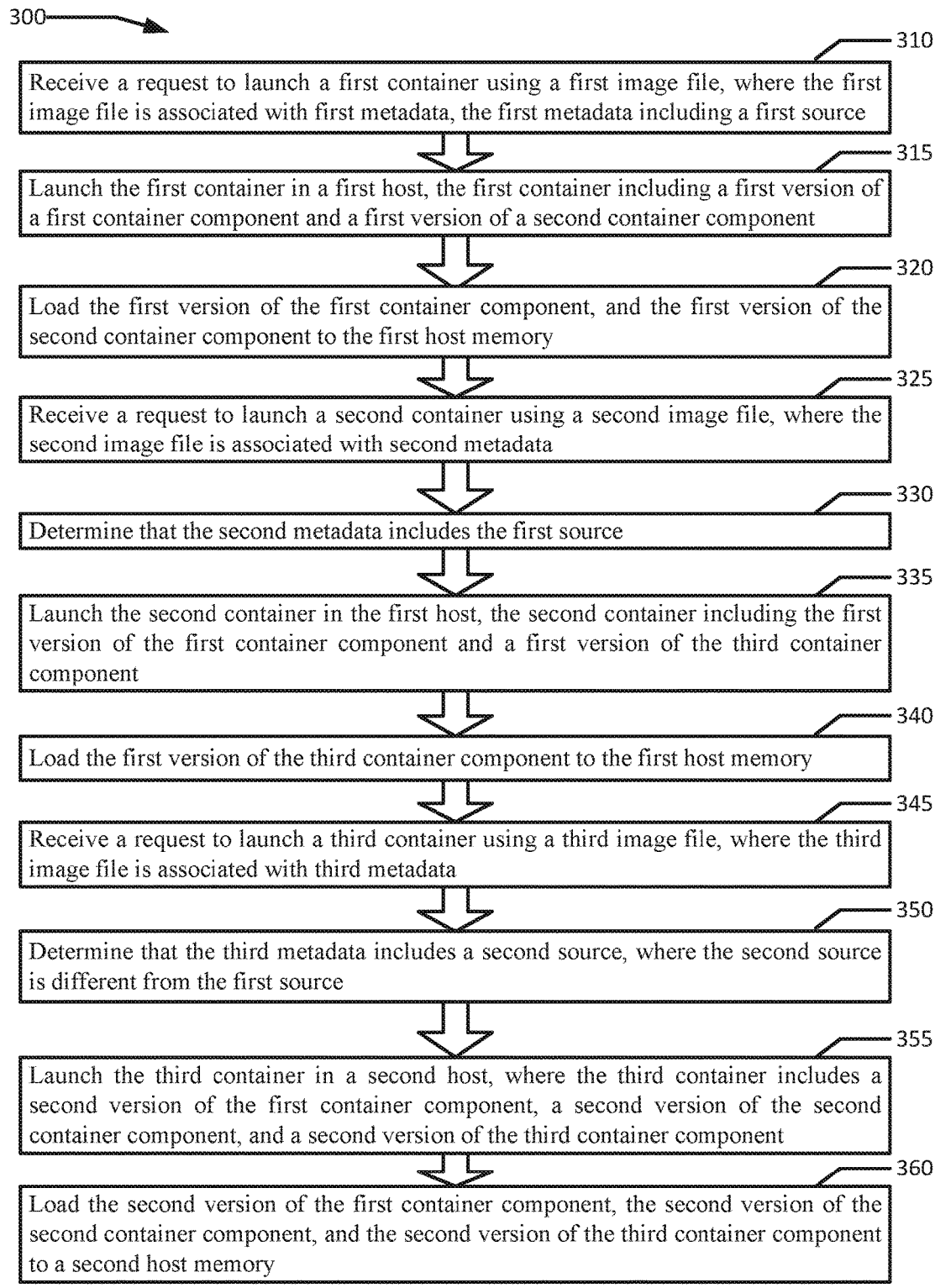
FIG. 3 is a flowchart illustrating an example of co-locating containers based on source to improve compute density according to an example of the present disclosure.

FIG. 3 is a flowchart illustrating an example of co-locating containers based on source to improve compute density according to an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both. In an example, the method is performed by a scheduler 140 operating in conjunction with hosts 110A-B and a plurality of containers.

The scheduler receives a request to launch a first container using a first image file, where the first image file is associated with first metadata, and the first metadata includes a first source (block 310). In an example, the scheduler 140 may be responsible for allocating containers to physical hosts. In the example, the scheduler 140 may determine whether a host has sufficient system resources to host a particular container, for example, CPU (cores or shares), Graphics Processing Unit "GPU" (cores or slices), memory (size and I/O rates), persistent storage (size and I/O rates), network bandwidth, IP addresses, network routes, etc. In an example, the scheduler 140 may receive a request to launch a container using image file 150. In the example, the scheduler 140 may launch the new container by copying image file 150 to a host and then launching the copy of image file 150 to become an independently executing container. In an example, the scheduler 140 may determine that both host 110A and host 110B have sufficient available system resources to host a container based on image file 150. In an example, the scheduler 140 makes a determination that the hosts 110A-B have sufficient available system resources based on system resource requirements included in metadata 151. In an example, scheduler 140 may receive a request to launch a container 152 using image file 150, the image file 150 being associated with metadata 151, and metadata 151 including a source 190A. In an example, source 190A may be the contents of a field or entry in metadata 151, or derived from the contents of one or more fields in metadata 151. In an example, source 190A may be a provider of the operating system used by containers based on image file 150, for example, Red Hat®. In an example, metadata 151 may be exclusively associated with one single source, for example, source 190A. In an example, source 190A may be associated with one or more components of image file 150. For example, source 190A in metadata 151 may be associated with component 170A. In an example, source 190A may be identified based on an identifying signature in metadata 151 associated with image file 150. In an example, an identifying signature may be a hash or checksum of the whole image file 150 or a part of image file 150 such as a layer of an image file 150 or a component included in image file 150. In an example, an identifying signature may be associated with a layer within an image file. In an example, a container component may be stored as an individual layer in an image file.

The scheduler launches the first container in a first host, where the first container includes a first version of a first container component and a first version of a second container component (block 315). The scheduler 140 may launch container 152 including component 170A (e.g., a copy of a first version of a first component) and component 175A (e.g., a copy of a first version of a second component) in host 110A. In an example, component 170A may be a Red Hat® version of a libc library for executing C code, and component 175A may be a Red Hat® version of a libc++ library for executing C++ code. In another example, components 170A and 175A may be two libraries from the same release version of a software provider. For example, components 170A and 175A may be two libraries both belonging to release X.YZ of a given operating system. In an example, the scheduler 140 may determine that either host 110A or host 110B is equally suited to host container 152. In an example, a random distribution is used to select host 110A for hosting container 152. In another example, the scheduler 140 may determine to launch container 152 on host 110A for a reason other than a random distribution. In an example, the host 110A or a host operating system associated with host 110A may share a source (e.g., 190A or 190B) with image files 150 and 155. For example, the scheduler 140 may determine that host 110A is also executing Red Hat® Linux® as a host operating system.

The first version of the first container component and the first version of the second container component are loaded to a first host memory (block 320). In an example, components 170A and 175A are loaded to the memory of host 110A (e.g., memory device(s) 130A-B). In an example, memory device(s) 130A-B may be RAM devices. In an example, component 170A (e.g., libc) may be loaded to memory device(s) 130A-B in response to a request to execute C code in container 152, and component 175A (e.g., libc++) may be loaded to memory device(s) 130A-B in response to a request to execute C++ code in container 152. In an example, the container 152 may access the memory device(s) 130A-B through one or more layers of virtualization. In an example, the container 152 may be hosted within a virtual machine executing on a hypervisor on host 110A. In an example where the host 110A executes Red Hat® Linux® as a host operating system, host 110A may have already loaded Red Hat® versions of libc and libc++ to memory devices 130A and 130B prior to container 152 requesting to load components 170A and 175A to memory device(s) 130A-B. In the example, the host 110A may respond to container 152 requesting to load components 170A and 175A to memory device(s) 130A-B by mapping the host 110A's copy of the same components (e.g., Red Hat® versions of libc and libc++) to container 152.

The scheduler receives a request to launch a second container using a second image file, where the second image file is associated with second metadata (block 325). In an example, scheduler 140 may receive a request to launch a container 157 using image file 155, the image file 155 being associated with metadata 156, and metadata 156 including a source 190B. In an example, source 190B may be the contents of a field or entry in metadata 156, or derived from the contents of one or more fields in metadata 156. In an example, source 190B may be a provider of the operating system used by containers based on image file 155, for example, Red Hat®. In an example, the scheduler 140 may determine that both host 110A and host 110B have sufficient available system resources to host a container based on image file 155. In an example, the scheduler 140 makes a determination that the hosts 110A-B have sufficient available system resources based on system resource requirements included in metadata 151.

The scheduler determines that the second metadata includes the first source (block 330). In an example, the scheduler 140 may determine that metadata 156 includes source 190B, and that source 190B is the same source 190A, for example, both source 190A and 190B may be the same operating system provider. In another example, image files 150 and 155 may belong to a first plurality of image files. In the example, the first plurality of image files may be a plurality of the image files stored in the image repository 115. In an example, the first plurality of image files (e.g., image files 150 and 155) may be associated with each other due to a variety of reasons that may influence the likelihood that the members of the first plurality of image files sharing common components. For example, the first plurality of image files may cooperate to perform a common function, cooperate to perform an aggregated function, or are associated with a respective first plurality of metadata, each metadata of which includes the first source. In an example, the scheduler 140 may determine that image files 150 and 155 are both image files belonging to a group of image files that may be used to launch containers that cooperate to deliver a particular service, such as delivering a search result or online shopping experience. In an example, containers that perform a unified function may be grouped together in a cluster that can be deployed together, (e.g., in a Kubernetes® pod). In an example, containers 150 and 155 may belong to the same Kubernetes® pod or cluster in another container clustering technology. In an example, containers belonging to the same cluster may be deployed simultaneously by a scheduler 140, with priority given to launching the containers from the same pod on the same physical host. In an example, metadata 151 and 156 may be the same metadata and associated with a cluster of image files or containers rather than with any particular image file.

The scheduler launches the second container in the first host, wherein the second container includes the first version of the first container component and a first version of the third container component (block 335). The scheduler 140 may launch container 157 including component 170B (e.g., a copy of a first version of a first component) and component 180A (e.g., a copy of a first version of a third component) in host 110A. In an example, component 170B may be a Red Hat® version of a libc library for executing C code, and component 180A may be a version of a rt.jar library packaged by Red Hat® for executing Java® code. In another example, components 170B and 180A may be two libraries from the same release version of a software provider. In an example, the scheduler 140 may determine that host 110A is more suited to hosting container 157 than host 110B. For example, the scheduler 140 may determine that host 110A is more suited to hosting container 157 than host 110B because sources 190A and 190B are the same source. In another example, the scheduler 140 may launch the container 157 in host 110A because the scheduler 140 determines that container 157 shares at least one common component with container 152 (e.g., a library). In an example, the scheduler 140 may launch container 157 in host 110A because a component of container 157 (e.g., component 170B and/or component 180A) shares the same source as a component of container 152 (e.g., component 170A and/or component 175A).

The first version of the third container component is loaded to the first host memory (block 340). In an example, component 180A is loaded to the memory of host 110A (e.g., memory device(s) 130A-B). In an example, memory device(s) 130A-B may be RAM devices. In an example, component 180A (e.g., rt.jar) may be loaded to memory device(s) 130A-B in response to a request to execute Java® code in container 157. In an example, host 110A may have already loaded a Red Hat® version of libc to memory devices 130A and/or 130B prior to container 157 requesting to execute C code or to load component 170B to memory device(s) 130A-B. For example, component 170B may be a second copy of the same component as component 170A, already loaded to memory device(s) 130A-B upon request by container 152 or a host operating system for host 110A. In the example, the host 110A may respond to container 152 requesting to load component 170B to memory device(s) 130A-B by mapping the copy of the same components already present in memory device(s) 130A-B to container 157. Therefore, the first version of the first component (e.g., component 170B) does not need to be loaded again to memory device(s) 130A-B, thereby avoiding latency in executing a program requiring component 170B and also decreasing the memory usage of container 157.

The scheduler receives a request to launch a third container using a third image file, where the third image file is associated with third metadata (block 345). In an example, scheduler 140 may receive a request to launch a container 162 using image file 160, the image file 160 being associated with metadata 161, and metadata 161 including a source 195A. In an example, source 195A may be the contents of a field or entry in metadata 161 or derived from the contents of one or more fields in metadata 161. In an example, source 195A may be a provider of the operating system used by containers based on image file 160, for example, SUSE®. In an example, the scheduler 140 may determine that both host 110A and host 110B have sufficient available system resources to host a container based on image file 160. In an example, the scheduler 140 makes a determination that the hosts 110A-B have sufficient available system resources based on system resource requirements included in metadata 161.

The scheduler determines that the third metadata includes a second source, where the second source is different from the first source (block 350). In an example, the scheduler 140 may determine that metadata 161 includes source 195A, and that source 195A is a different source from sources 190A-B, for example, both source 190A and 190B may be the same operating system provider, while source 195A may be a different operating system provider. In another example, image file 160 may belong to a second plurality of image files. In the example, the second plurality of image files may be a plurality of the image files (e.g., image files 160 and 165) stored in the image repository 115.

The scheduler launches the third container in a second host, where the third container includes a second version of the first container component, a second version of the second container component, and a second version of the third container component (block 355). The scheduler 140 may launch container 162 including container components 171A (e.g., a copy of a second version of a first component), 176A (e.g., a copy of a second version of a second component) and 181A (e.g., a copy of a second version of a third component) in host 110B. In an example, component 171A may be a SUSE® version of a libc library for executing C code, component 176A may be a SUSE® version of a libc++ library for executing C++ code, and component 181A may be a version of a rt.jar library packaged by SUSE® for executing Java® code. In another example, components 171A, 176A and 181A may be three libraries from the same release version of a software provider. In an example, the scheduler 140 may determine that host 110B is more suited to hosting container 162 than host 110A. In an example, the scheduler 140 may determine that 110B is more suited to hosting container 162 than host 110A because source 195A is a different source from sources 190A and 190B. In another example, the scheduler 140 may launch the container 162 in host 110B because the scheduler 140 determines that container 162 shares at least one common component with a container hosted on host 110B or with host 110B's operating system.

The second version of the first container component, the second version of the second container component, and the second version of the third container component are loaded to a second host memory (block 360). In an example, components 171A, 176A, and 181A are loaded to the memory of host 110B (e.g., memory device 130C). In an example, memory device 130C may be a RAM device. In an example, components 171A, 176A, and 181A (e.g., libc, libc++ and rt.jar) may be loaded to memory device 130C in response to a request to execute C, C++, and/or Java® code in container 162. In an example, host 110B may have already loaded SUSE® versions of libc, libc++ and/or rt.jar to memory device 130C prior to container 162 requesting to execute C, C++ and/or Java® code or to load component 171A, 176A and/or 181A to memory device 130C.

In an example, image file 160 may belong to a second plurality of image files along with image file 165, the second plurality of metadata being associated with a respective plurality of metadata (e.g., metadata 161 and metadata 166). In an example, a container 167 may be launched in host 110B based on image file 165, where image file 165 is associated with metadata 166 which includes source 195B. In an example, sources 195A and 195B may represent the same source, for example, SUSE®. In an example, the second plurality of image files (e.g., image files 160 and 165) may be associated with each other due to a variety of reasons that may influence the likelihood that the members of the second plurality of image files sharing common components. For example, the second plurality of image files may cooperate to perform a common function, cooperate to perform an aggregated function, or are associated with a respective second plurality of metadata, each metadata of which includes the second source. In an example, the scheduler 140 may determine that image files 160 and 165 are both image files belonging to a group of image files that may be used to launch containers that cooperate to deliver a particular service, such as delivering a search result or online shopping experience. In an example, containers 160 and 165 may belong to the same Kubernetes® pod or cluster in another container clustering technology. In an example, containers belonging to the same cluster may be deployed simultaneously by a scheduler 140, with priority given to launching the containers from the same pod on the same physical host. In an example, metadata 161 and 166 may be the same metadata and associated with a cluster of image files or containers rather than with any particular image file.

In an example, the scheduler 140 may be requested to launch additional containers in hosts 110A-B. For example, a request to launch another copy of a container using image file 150 may be routed to host 110A because container 152 based on image file 150 is already executing on host 110A. A second container based on image file 150 may also be routed to host 110A based on metadata 151 including the first source, which corresponds to a reference to the first source in other containers executing on host 110A. In another example, host 110A may not have the system resource capacity remaining to execute another copy of a container based on image file 150, and the scheduler 140 may launch a new copy of a container based on image file 150 on host 110B or another host. In another example, it may be determined that too high a percentage of the containers based on image file 150 are executing on host 110A and a new copy of a container based on image file 150 may be launched on host 110B or another host. In an example, it may be advantageous to launch multiple copies of containers based on the same image file, or related image files (e.g., where the image files all belong to containers of the same cluster such as a Kubernetes pod) because the containers will likely share libraries reducing their individual memory footprint. In some examples, up to half of the memory allocated for executing an application within a container, and up to half of the execution time for executing the application may be taken up by loading libraries to host memory. In such examples, a pre-loaded shared library may advantageously double the speed of application execution and the container density on a given physical host. Compared to systems where containers are randomly assigned to hosts that have capacity, a typical improvement may be 30%-50% reductions in overall memory usage, as heap memory usage is eliminated where a shared copy of a component may be accessed. In a typical container deployment, with 2 GB of allocated RAM, up to 1 GB may be conserved.

In an example, the scheduler 140 may be requested to launch a fourth container based on a fourth image file associated with fourth metadata. In the example, the fourth container includes the first container component and the second container component, and the fourth metadata includes a reference to the first source associated with the first container component and a reference to the second source associated with the second container component. In an example, the scheduler 140 may select whether to launch the fourth container in host 110A or host 110B based on a comparison of (i) a first size of the first container component and a second size of the second container component, (ii) a first aggregate size of components associated with the first source and a second aggregated size of components associated with the second source in the fourth metadata, (iii) a first quantity of components associated with the first source and a second quantity of components associated with the second source in the fourth metadata, and/or (iv) a first remaining capacity of the first host memory and a second remaining capacity of the second host memory. In an example, sharing a larger sized container component with other containers on the same host may be more advantageous in terms of loading and application execution speed. In another example, it may be determined that a larger quantity of smaller shared or potentially shared container components would yield a higher likelihood of a container benefiting from shared components than a lower quantity of larger components. In another example, the remaining capacity of the hosts 110A and 110B for hosting more containers is dispositive for allocating a new container. In an example, with sufficient similar containers executing on the same host, the odds of a given library being garbage collected before being used by one of the containers is much reduced. In an example, a requested memory allocation size for a container launched while practicing co-locating containers to improve compute density may be reduced as a programmer may more accurately plan for very little memory overhead for loading libraries, therefore only requesting the memory needed by the applications executing on a container for data. In an example, reduced requested memory may allow a container to be launched on a host that would otherwise not have memory capacity to host such a container. However, in some examples, it may be disadvantageous to launch too many containers performing the same or similar functions in any given hardware node because the particular hardware node may become a single point of failure for a given service performed by the type of container hosted on that hardware node. Therefore, it may be advantageous in some cases to spread similar containers between several hosts, for example, in a round robin manner within the subset of hosts.

Figure 4:
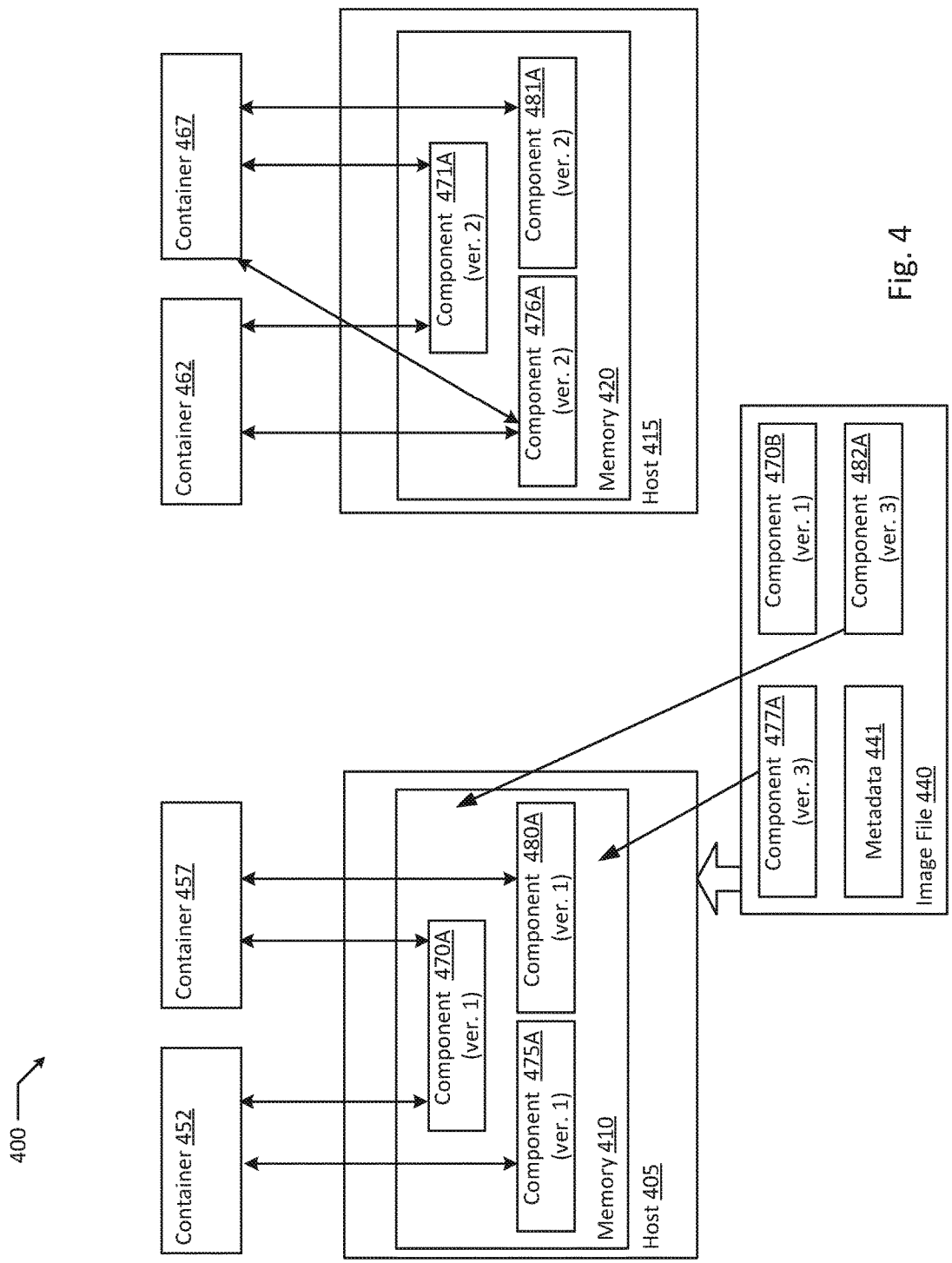
FIG. 4 is a block diagram of an example system co-locating a container to improve compute density according to an example of the present disclosure.

FIG. 4 is a block diagram depicting an example system 400 co-locating a container to improve compute density according to an example of the present disclosure. In an example, system 400 includes two hosts 405 and 415. In the example, host 405 includes memory 410, container 452 and container 457. In the example, container components 470A and 475A in memory 410 which may be first versions of a first and a second container component are mapped to container 452. In the example, container components 470A and 480A in memory 410 which may be first versions of a first and a third container component are mapped to container 457. In the example, host 415 includes memory 420, container 462 and container 467. In the example, container components 471A and 476A in memory 420 which may be second versions of a first and a second container component are mapped to container 462. In the example, container components 471A, 476A, and 481A in memory 410 which may be second versions of a first, a second, and a third container component are mapped to container 467.

In an example, a scheduler receives a request to launch another container in either host 405 or 415 based on image file 440. In the example, it is determined that containers launched from image file 180 include container components 470B, 477A and 482A. The scheduler may decide to launch a container based on image file 440 on host 405 because component 470B is a copy of component 470A, and therefore the container launched from image file 440 would share a component with containers 452 and 457. In an example, image file 440 may be associated with metadata 441, and the associated metadata 441 may include a first source that is also included in metadata 441 associated with the image files from which containers 452 and 457 are launched. In an example, the first source may be associated with the entirety of image file 440. In another example, the first source may be associated with only certain components of image file 440 such as component 470B. In an example, a container launched from image file 440 may require component 470B to execute an application, and host 405 may map component 470A which was already loaded into memory 410 to the container launched from image file 440 instead of loading a second, equivalent copy of the same component to memory 410 (e.g., component 470B). In an example, image file 440 launches a container that includes a third version of the second container component and a third version of the third container component. In the example, when a container launched using image file 440 needs to execute code requiring the second container component, component 477A (e.g., a third version of the second container component) is loaded to memory 410. In the example, when a container launched using image file 440 needs to execute code requiring the third container component, component 482A (e.g., a third version of the third container component) is loaded to memory 410. In an example, components 477A and 482A may be associated with a third source in the metadata 441 associated with image file 440.

Figure 5:
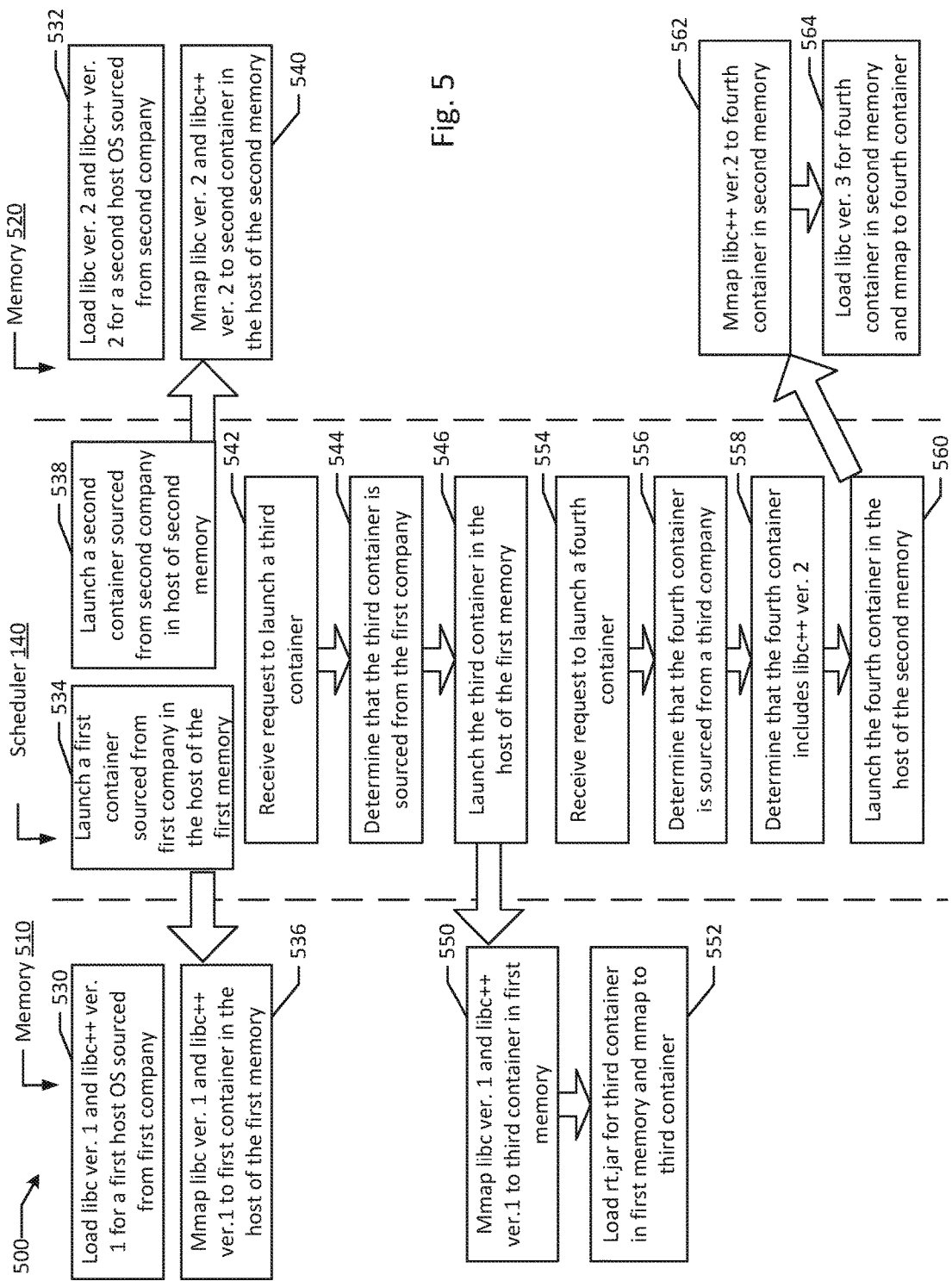
FIG. 5 is a flow diagram illustrating an example system co-locating containers based on source to improve compute density according to an example of the present disclosure.

FIG. 5 is a flow diagram illustrating an example system co-locating containers based on source to improve compute density according to an example of the present disclosure. Although the examples below are described with reference to the flowchart illustrated in FIG. 5, it will be appreciated that many other methods of performing the acts associated with FIG. 5 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In example system 500, a scheduler 140 is in communication with the hosts including memory 510 and memory 520. In an example, scheduler 140 may launch containers in the hosts including memory 510 and 520.

In an example, memory 510 loads libc version 1 and libc++ version 1 for a first host operating system of the host including memory 510, the host operating system being sourced from a first company (block 530). In an example, the first company may be Red Hat®. In an example, memory 520 loads libc version 2 and libc++ version 2 for a second host operating system of the host including memory 520, the host operating system being sourced from a second company (block 532). In an example the second company may be SUSE®. In an example, it may be advantageous to launch containers sourced from a company on a host executing a host operating system from the same company to increase the likelihood that the host operating system will load a library required by the containers to the host memory. The scheduler 140 may launch a first container sourced from the first company in the host of memory 510 (block 534). The copy of libc version 1 and libc++ version 1 previously loaded for the first host operating system may be mmaped to the first container executing in the host of memory 510 (block 536). In an example, libc version 1 and libc++ version 1 may be mmaped to the first container in response to the first container attempting to execute C and C++ code respectively. The scheduler 140 may launch a second container sourced from the second company in the host of memory 520 (block 538). The copy of libc version 2 and libc++ version 2 previously loaded for the second host operating system may be mmaped to the second container executing in the host of memory 510 (block 540). In an example, libc version 2 and libc++ version 2 may be mmaped to the second container in response to the second container attempting to execute C and C++ code respectively.

In an example, the scheduler 140 receives a request to launch a third container (block 542). The scheduler 140 determines that the third container is sourced from the first company (block 544). The scheduler 140 launches the third container in the host of memory 510 (block 546). The copy of libc version 1 and libc++ version 1 previously loaded for the first host operating system may be mmaped to the third container (block 550). A copy of rt.jar may be loaded for the third container to memory 510 and mmaped to the third container (block 552). In an example, the third container may require rt.jar to execute Java® code in addition to C and C++ code.

In an example, the scheduler 140 receives a request to launch a fourth container (block 554). The scheduler 140 determines that the fourth container is sourced from a third company (block 556). The scheduler 140 determines that the fourth container includes libc++ version 2 (block 558). In an example, the fourth container includes the same version of libc++ that is already loaded in memory 520, an indicative sign that the fourth container may share more components such as libraries with other containers loaded on the host of memory 520. The scheduler 140 launches the fourth container in the host of memory 520 (block 560). The copy of libc++ version 2 previously loaded for the second host operating system may be mmaped to the fourth container (block 562). A copy of libc version 3 may be loaded for the fourth container to memory 520 and mmaped to the fourth container (block 564). In an example, the fourth container includes a different version of libc from the first three containers, but may still share other components with the other containers and host operating systems.

Figure 6:
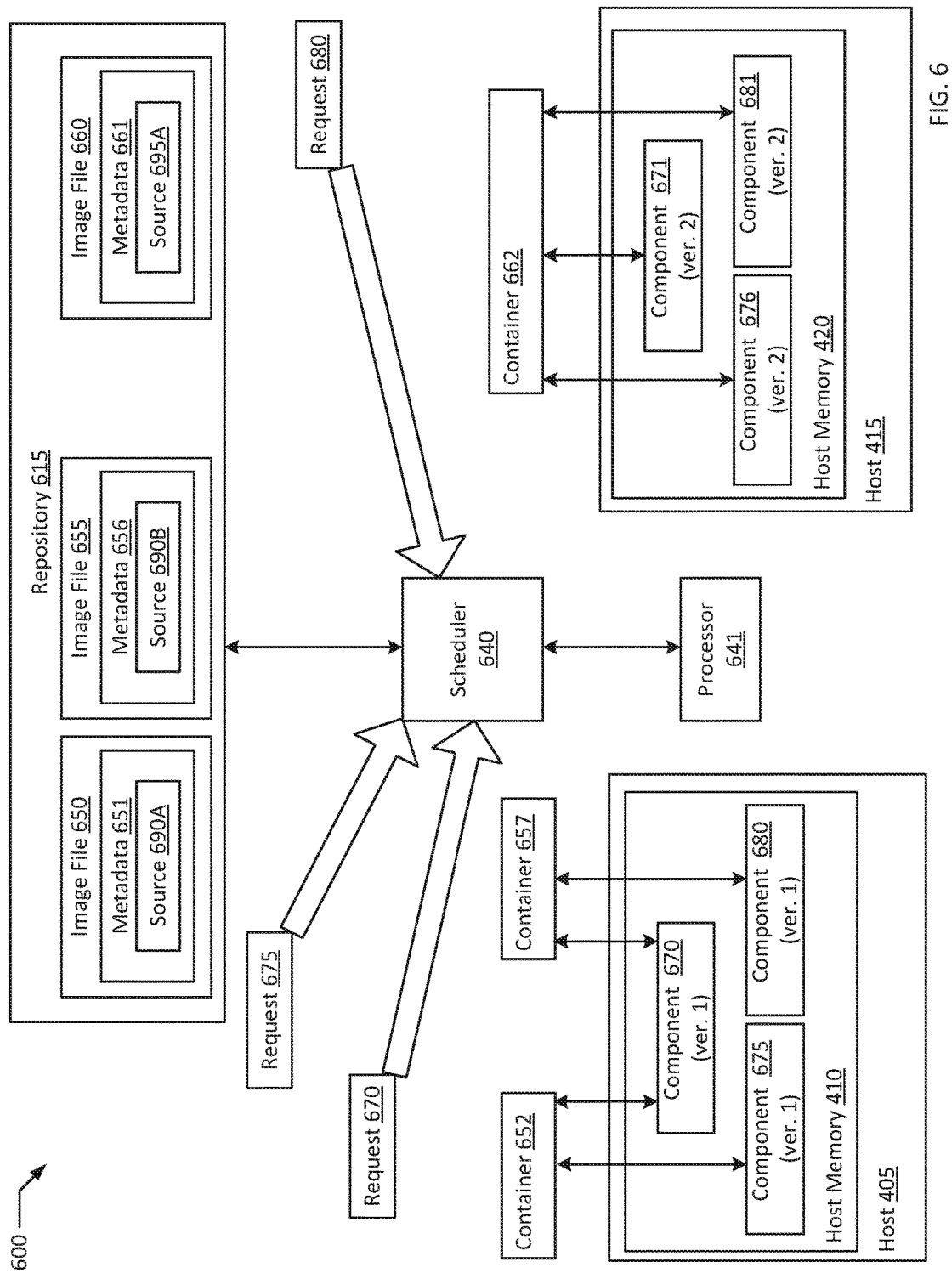
FIG. 6 is a block diagram of an example system co-locating containers based on source to improve compute density according to an example of the present disclosure.

FIG. 6 is a block diagram of an example system co-locating containers based on source to improve compute density according to an example of the present disclosure. Example system 600 may include a repository 615 storing a plurality of image files (e.g., image files 650 and image files 655) associated with a respective plurality of metadata (e.g., metadata 651 and metadata 656). Repository 615 may also store image file 660 associated with metadata 661. In an example, host 405 is associated with host memory 410 and host 415 is associated with host memory 420. A scheduler 640 may execute on one or more processors 641. The scheduler 640 receives a request 670 to launch container 652 using image file 650, where metadata 651 includes source 690A. Container 652 is launched in host 405, where container 652 includes a first version of a container component 670 and a first version of a container component 675A. The first version of container component 670 and the first version of container component 675 are loaded to host memory 410.

In an example, the scheduler 640 receives request 675 to launch container 657 using image file 655. The scheduler 640 determines that metadata 656 includes source 690B. In an example, source 690B is the same source as source 690. Container 657 is launched in host 405, where container 657 includes a first version of a container component 670 and a first version of a container component 680. The first version of container component 680 is loaded to host memory 410.

In an example, the scheduler 640 receives a request 680 to launch container 662 using image file 660. The scheduler 640 determines that metadata 661 includes source 695A, where source 695A is different from sources 690A-B. Container 662 is launched in host 415, where container 662 includes a second version of a container component 671, a second version of a container component 676, and a second version of a container component 681. In an example, container components 670 and 671 may be different versions of the same container component, such as versions produced by different companies or sources. In an example, container components 675 and 676 may be different versions of the same container component, such as versions produced by different companies or sources. Also, for example, container components 680 and 681 may be different versions of the same container component, such as versions produced by different companies or sources. The second version of container component 671, the second version of container component 676 and the second version of container component 681 are loaded to host memory 420.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a repository storing:
a first plurality of image files associated with a respective first plurality of metadata, the first plurality of image files including at least a first image file associated with first metadata and a second image file associated with second metadata; and
a third image file associated with third metadata;
a first host associated with a first host memory;
a second host associated with a second host memory;
one or more processors; and
a scheduler executing on the one or more processors to:
receive a request to launch a first container using the first image file, wherein the first metadata includes a first source;
launch the first container in the first host, wherein the first container includes a first version of a first container component and a first version of a second container component, and the first host memory is associated with a first host operating system that is associated with the first source;
load the first version of the first container component and the first version of the second container component to the first host memory, wherein the first container includes a third container component, the first host determines that the third container component has a same identifying signature as a host operating system component already loaded in the first host memory, and the first container maps the host operating system component in the first host memory as the third container component;
receive a request to launch a second container using the second image file;
determine that the second metadata includes the first source;
responsive to determining that the second metadata includes the first source, launch the second container in the first host, wherein the second container includes the first version of the first container component and a first version of a fourth container component, and the first container and the second container share a same copy of the first version of the first container component in the first host memory, which was loaded by the first container;
load the first version of the fourth container component to the first host memory;
receive a request to launch a third container using the third image file;
determine that the third metadata includes a second source, wherein the second source is different from the first source;
responsive to determining that the third metadata includes the second source, launch the third container in the second host, wherein the third container includes a second version of the first container component, a second version of the second container component, and a second version of the fourth container component; and
load the second version of the first container component, the second version of the second container component, and the second version of the fourth container component to the second host memory.

2. The system of claim 1, wherein the first plurality of image files at least one of (i) cooperate to perform a common function, (ii) cooperate to perform an aggregated function, and (iii) are associated with the respective first plurality of metadata, each metadata of which includes the first source.

3. The system of claim 1, wherein the third image file is a member of a second plurality of image files associated with a respective second plurality of metadata, each metadata of which includes the second source.

4. The system of claim 3, wherein the scheduler launches a fourth container with a fourth image file in the second host, the fourth image file being associated with fourth metadata that includes the second source.

5. The system of claim 1, wherein the first metadata is exclusively associated with the first source.

6. The system of claim 1, wherein the first source is associated with the first container component.

7. The system of claim 6, wherein the scheduler launches a fourth container with a fourth image file on the first host, and wherein the fourth image file is associated with fourth metadata, which includes the first source.

8. The system of claim 7, wherein the first source is associated with the first container component in the fourth metadata, and a third source is associated with the second container component in the fourth metadata.

9. The system of claim 8, wherein a third version of the second container component is loaded to the first host memory.

10. The system of claim 7, wherein the first source is associated with the first container component in the fourth metadata, and the second source, is associated with the second container component in the fourth metadata, and the scheduler launches the fourth container in the first host memory based on a comparison of at least one of (i) a first size of the first container component and a second size of the second container component, (ii) a first aggregate size of components associated with the first source and a second aggregated size of components associated with the second source in the fourth metadata, (iii) a first quantity of components associated with the first source and a second quantity of components associated with the second source in the fourth metadata, and (iv) a first remaining capacity of the first host memory and a second remaining capacity of the second host memory.

11. The system of claim 1, wherein an identifying signature of at least one of an image file and a container component is associated with the first source.

12. The system of claim 1, wherein the scheduler launches a fourth container with the first image file in the first host.

13. A method of assigning containers to hosts, the method comprising:

receiving a request to launch a first container using a first image file, wherein the first image file is associated with first metadata, the first metadata including a first source;

launching the first container in a first host, wherein the first container includes a first version of a first container component and a first version of a second container component, and a first host memory is associated with a first host operating system that is associated with the first source;

loading the first version of the first container component, and the first version of the second container component to the first host memory, wherein the first container includes a third container component, the first host determines that the third container component has a same identifying signature as a host operating system component already loaded in the first host memory, and the first container maps the host operating system component in the first host memory as the third container component;

receiving a request to launch a second container using a second image file, wherein the second image file is associated with second metadata;

determining that the second metadata includes the first source;

responsive to determining that the second metadata includes the first source, launching the second container in the first host, wherein the second container includes the first version of the first container component and a first version of the fourth container component, and the first container and the second container share a same copy of the first version of the first container component in the first host memory, which was loaded by the first container;

loading the first version of the fourth container component to the first host memory;

receiving a request to launch a third container using a third image file, wherein the third image file is associated with third metadata;

determining that the third metadata includes a second source, wherein the second source is different from the first source;

responsive to determining that the third metadata includes the second source, launching the third container in a second host, wherein the third container includes a second version of the first container component, a second version of the second container component, and a second version of the fourth container component; and loading the second version of the first container component, the second version of the second container component, and the second version of the fourth container component to a second host memory.

14. The method of claim 13, wherein the first image file and the second image file are members of a first plurality of image files, and members of the first plurality of image files at least one of cooperate to perform a common function, cooperate to perform an aggregated function, and are associated with a respective first plurality of metadata, each metadata of which includes the first source.

15. The method of claim 14, wherein the third image file is a member of a second plurality of image files associated with a respective second plurality of metadata, each metadata of which includes a second source; and the scheduler launches a fourth container with a fourth image file in the second host memory, the fourth image file being associated with fourth metadata that includes the second source.

16. A computer-readable non-transitory storage medium storing executable instructions, which when executed by a computer system, cause the computer system to:

receive a request to launch a first container using a first image file, wherein the first image file is associated with first metadata, the first metadata including a first source;

launch the first container in a first host, wherein the first container includes a first version of a first container component and a first version of a second container component, and a first host memory is associated with a first host operating system that is associated with the first source;

load the first version of the first container component, and the first version of the second container component to the first host memory, wherein the first container includes a third container component, the first host determines that the third container component has a same identifying signature as a host operating system component already loaded in the first host memory, and the first container maps the host operating system component in the first host memory as the third container component;
receive a request to launch a second container using a second image file, wherein the second image file is associated with second metadata;
determine that the second metadata includes the first source;
responsive to determining that the second metadata includes the first source, launch the second container in the first host, wherein the second container includes the first version of the first container component and a first version of the fourth container component, and the first container and the second container share a same copy of the first version of the first container component in the first host memory, which was loaded by the first container;
load the first version of the fourth container component to the first host memory;

receive a request to launch a third container using a third image file, wherein the third image file is associated with third metadata;
determine that the third metadata includes a second source, wherein the second source is different from the first source;
responsive to determining that the third metadata includes the second source, launch the third container in a second host, wherein the third container includes a second version of the first container component, a second version of the second container component, and a second version of the fourth container component; and
load the second version of the first container component, the second version of the second container component, and the second version of the fourth container component to a second host memory.

* * * * *